E. P. NICHOLS.
MACHINE FOR EVENING AND GRADING SOLES, TAPS, &c.
APPLICATION FILED AUG. 6, 1904.

1,009,988.

Patented Nov. 28, 1911.
5 SHEETS—SHEET 3.

Witnesses.
Walter H. Naylor
Raphael G. Blanc.

Inventor.
Elmer P. Nichols
by Geo. H. Maxwell
Attorney.

E. P. NICHOLS.
MACHINE FOR EVENING AND GRADING SOLES, TAPS, &c.
APPLICATION FILED AUG. 6, 1904.

1,009,988.

Patented Nov. 28, 1911.

5 SHEETS—SHEET 4.

Witnesses.

Inventor.
Elmer P. Nichols
by Geo. H. Maxwell
Attorney.

E. P. NICHOLS.
MACHINE FOR EVENING AND GRADING SOLES, TAPS, &c.
APPLICATION FILED AUG. 6, 1904.

1,009,988.

Patented Nov. 28, 1911.

5 SHEETS—SHEET 5.

Witnesses.
Walter H. Naylor
Raphael G. Blanc

Inventor.
Elmer P. Nichols
by Geo. H. Maxwell
Attorney.

UNITED STATES PATENT OFFICE.

ELMER P. NICHOLS, OF MANCHESTER, NEW HAMPSHIRE, ASSIGNOR TO LACENE MANUFACTURING COMPANY, OF MANCHESTER, NEW HAMPSHIRE, A CORPORATION OF MAINE.

MACHINE FOR EVENING AND GRADING SOLES, TAPS, &c.

1,009,988.   Specification of Letters Patent.   Patented Nov. 28, 1911.

Application filed August 6, 1904. Serial No. 219,755.

*To all whom it may concern:*

Be it known that I, ELMER P. NICHOLS, a citizen of the United States, and resident of Manchester, New Hampshire, have invented an Improvement in Machines for Evening and Grading Soles, Taps, &c., of which the following description, in connection with the accompanying drawings, is a specification, like letters on the drawings representing like parts.

My invention is an evening and grading machine for leather and relates to the kind of machine and of work explained in my Patents Re. No. 12,288, dated Nov. 22, 1904, and No. 841,809, dated Jan. 22, 1907.

My principal objects are to simplify the machine, decrease the power required, lighten the moving parts, and secure extreme accuracy and certainty of evening and grading under all conditions, besides adapting the machine to handle block-soles and the like.

The machine shown in my Patent No. 841,809, although capable of detecting thin spots along the longitudinal edges of soles, cannot handle block soles, but only round ended soles, because the block soles or square ended soles strike square against the edgers and hence cannot separate the feelers from each other, which is necessary in that machine in order to cause the feelers to feel the edges, the result being that only round ended soles whose oblique or rounded corners engage the edgers and wedge them apart can be graded by the machine of that patent.

Accordingly one of the chief objects of my present invention is to provide a machine capable of grading block soles.

Further advantages, and the constructional details of my invention will be pointed out more fully in connection with the following description, the invention being further defined in the appended claims, also forming a part of this specification.

Figure 1:
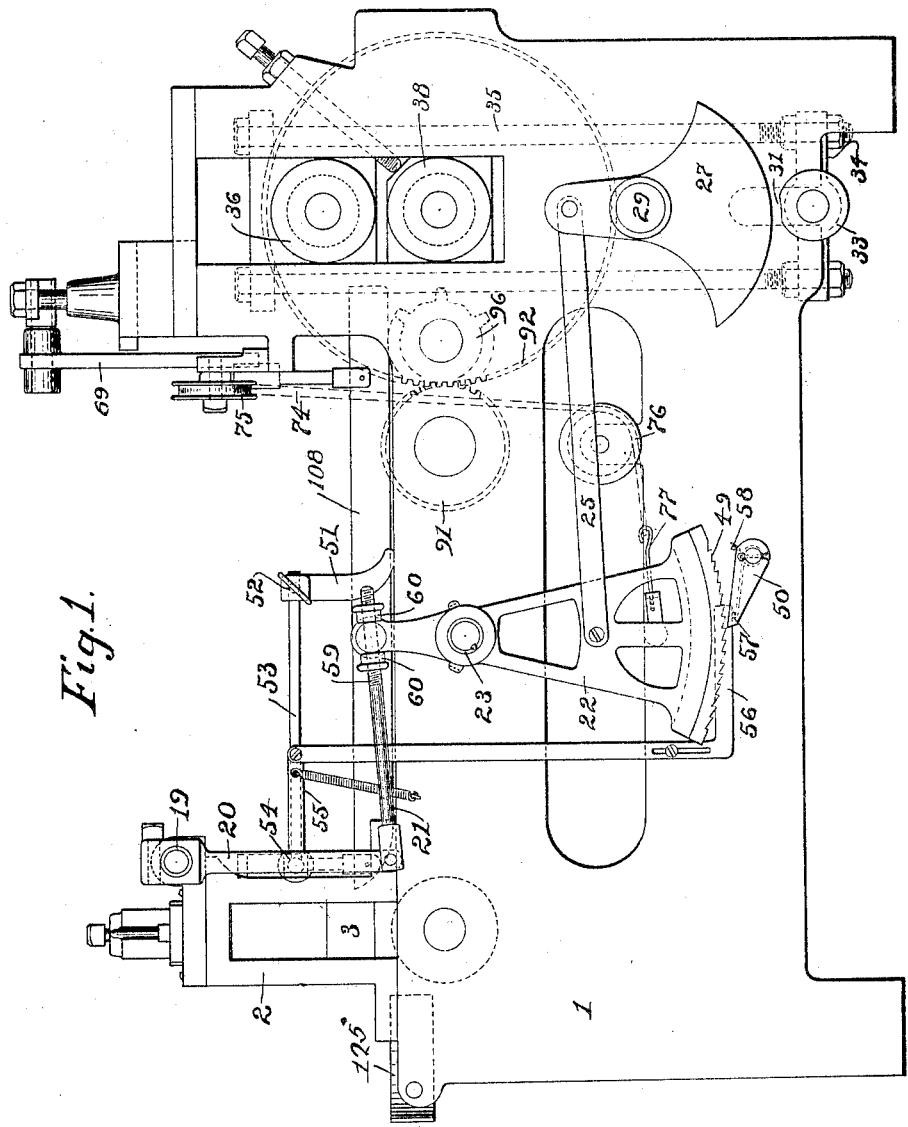
Figure 2:
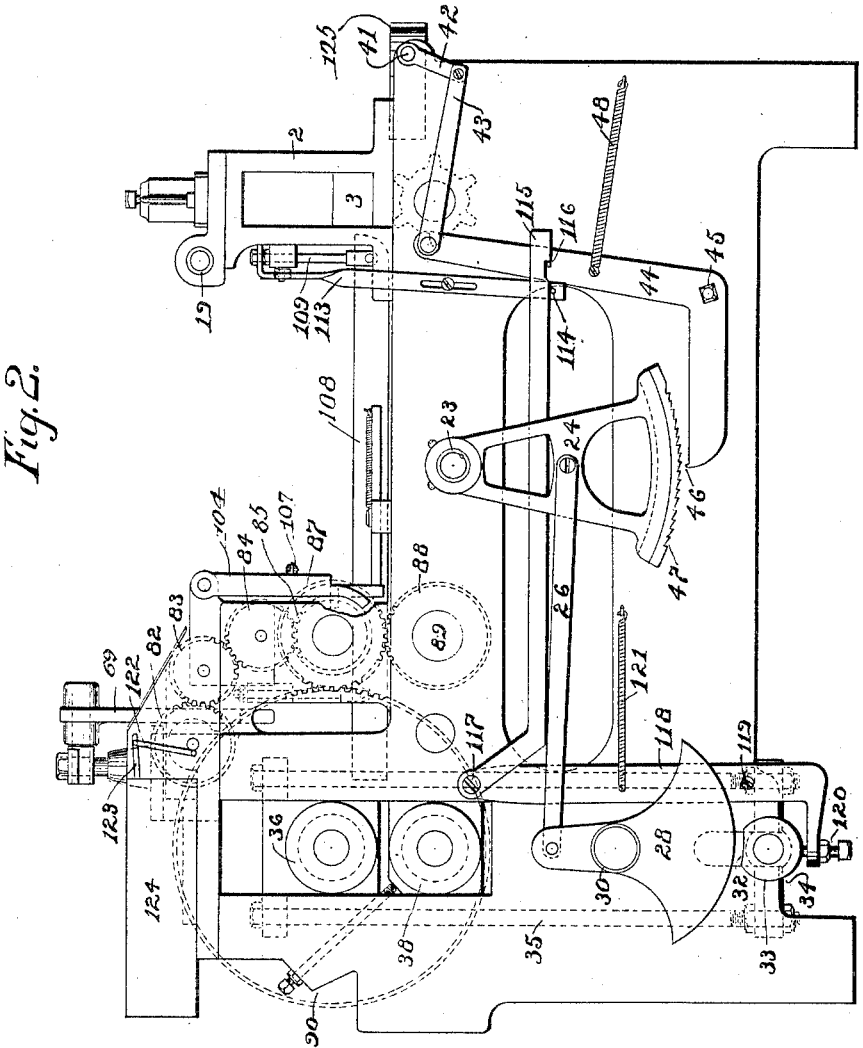
Figure 3:
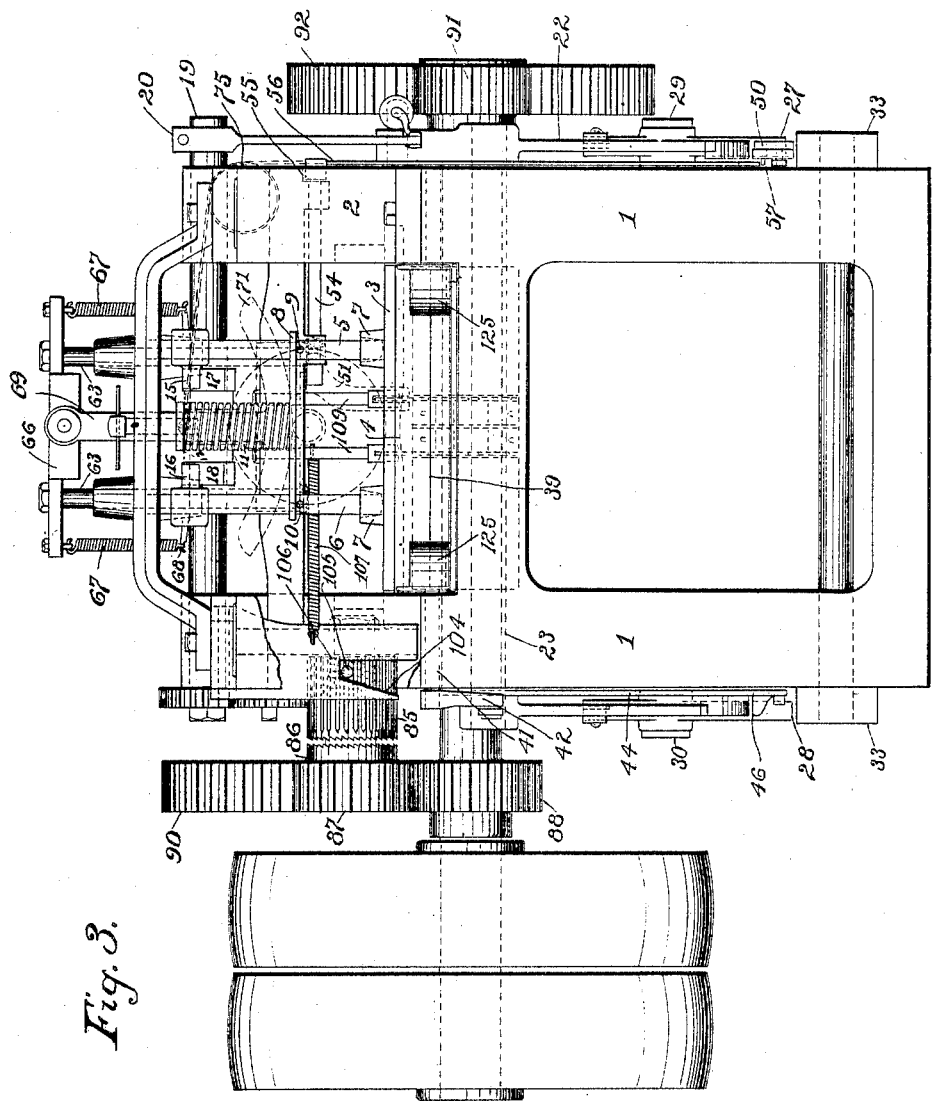
Figure 4:
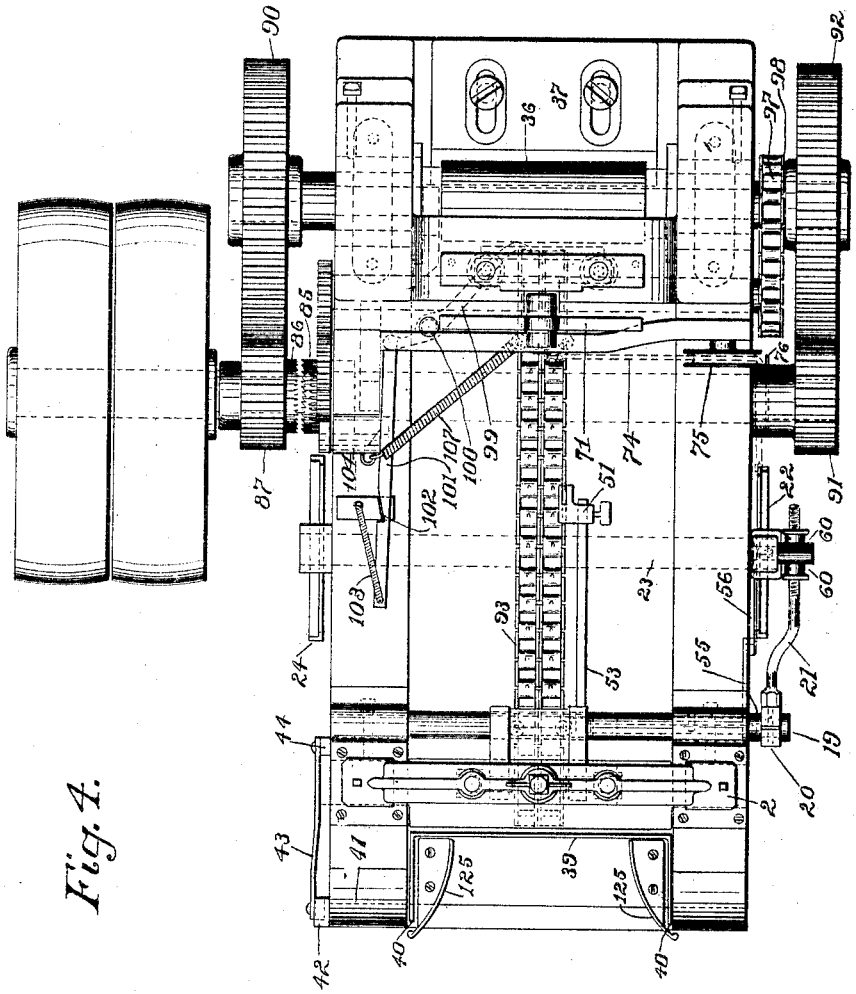
Figure 5:
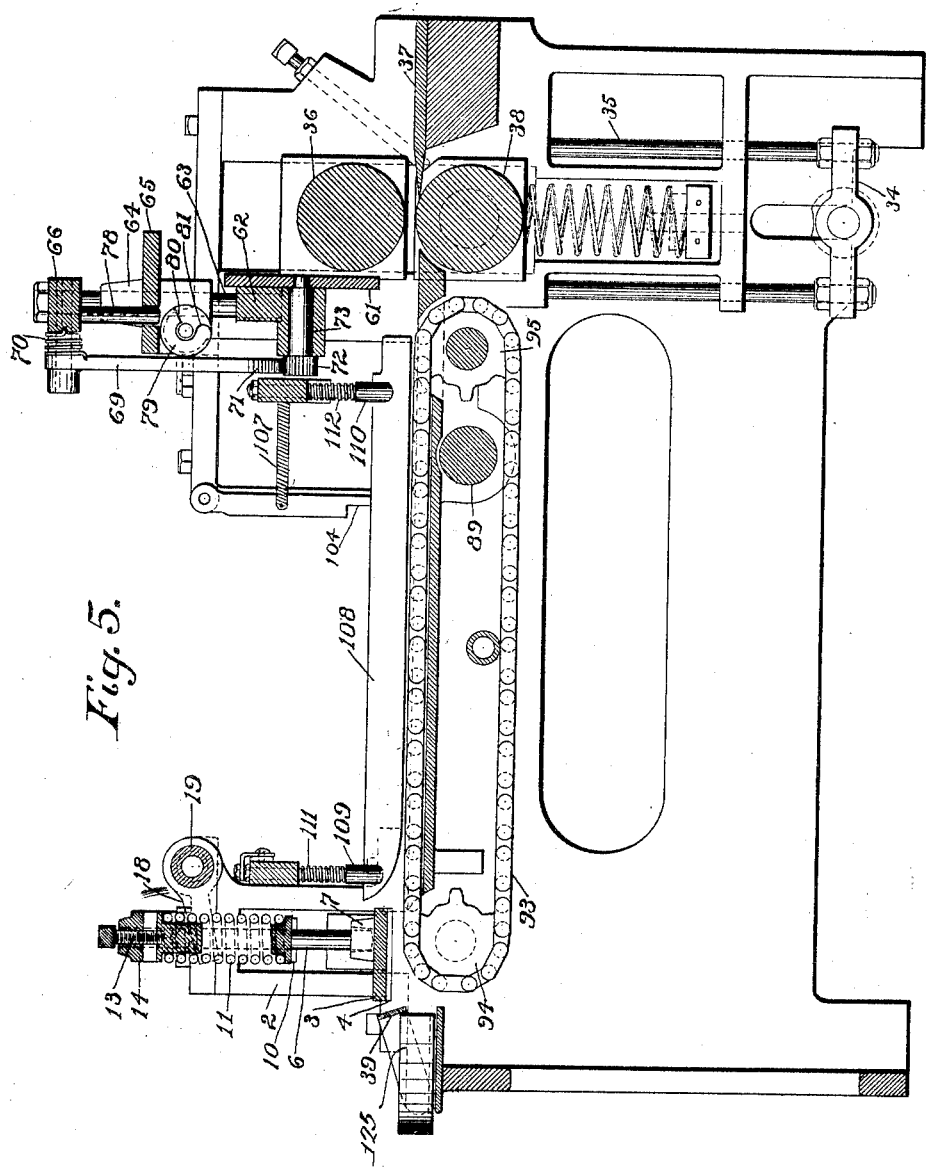

In the drawings, Figures 1 and 2 show the machine in side elevation viewed from the right hand side and left hand side, respectively. Fig. 3 is a front elevation thereof. Fig. 4 is a top plan view thereof, and Fig. 5 is a central, vertical, longitudinal section thereof.

My present machine operates in the same general manner as explained in my patents, the soles, taps, or other pieces of stock being fed in at one end of the machine where their varying thicknesses are determined by feelers and connected gage adjusting and setting mechanism, and are then carried beneath leather-engaging means or grade indicating means, shown in this embodiment of the invention as consisting of grade-marking or designating mechanism and evening mechanism whereupon the pieces are marked and cut or skived to the grade or thickness determined by the feelers.

One of the most distinctive features of the present feeler mechanism resides in having a balanced construction capable of following along the opposite edges of the irregularly shaped sole or other piece, without liability of slipping off or unequal pressure or uncertainty of action.

Slidingly mounted in uprights 2, at the front end of the frame 1 of the machine, is a plate 3 whose bottom side constitutes the detecting face or surface to engage the sole, being shown as slightly hollowed or cut away at 4, so as not to be affected by the middle portion of the leather sole being graded, and engaged by vertical posts 5, 6, herein shown as resting loosely at their lower ends in sockets 7 on the upper side of said plate, and held downward by an equalizing cross-bar 8 resting on brackets or horizontal pins 9, 10 carried by said posts 5, 6. A heavy spring 11 engages at its lower end said bar 8 and at its upper end a block 12 adjusted by a thumb screw 13 threaded through a top bar 14 bolted at its ends to the opposite uprights 2. Another species of this feeler mechanism is shown in my copending application Ser. No. 257,587 filed April 27, 1905, the present case containing the generic claims however to the invention broadly considered.

At their upper ends the posts 5, 6 carry fixed lugs 15, 16 projecting toward each other, see Fig. 3, and loosely engaging the upper sides of arms or levers 17, 18, fast on a rock-shaft 19 extending across the machine and carrying at its outer end a crank 20 connected by a link 21 to the upper end of a toothed sector 22 keyed to the projecting end of a shaft 23, see Fig. 1, passing through the machine. The shaft 23 has a somewhat similar toothed sector 24, keyed to its opposite end, see Fig. 2. The movement of these two toothed sectors or swinging levers 22, 24 is communicated by links 25, 26, to graduated or wedging cam stops 27, 28, pivoted at the opposite sides of the machine at 29, 30, respectively, to be engaged by the flattened upper surfaces 31, 32, of lugs 33 fast on the lower cross-bars 34 of the journal frame 35, which carries at its upper end the adjusting roll or pressure device 36, which flattens out the stock and determines the thickness to which the leather is to be cut by a knife 37, said leather being held up tightly against said roll 36 by a spring-pressed under roll 38 (as in my before mentioned patents.) The roll 36 is raised by the engagement therewith of the leather piece as it is fed through the machine until the lugs 33 strike the stops 27 and 28 and then unyieldingly engages the top side of the pieces, thereby controlling the position of the stock with relation to the knife. This knife and those parts which limit its operation on the stock constitute the evening mechanism (being one form of the stock grading mechanism), said evening mechanism consisting of means to cut away the undesired part of the leather, and means definitely to limit or control the operation of said cutting means so that no more leather shall be cut away than is desired, said cutting means being herein shown as a knife and said limiting means being herein shown as consisting of a pressure roll to engage the stock and a graduated or cam stop which definitely governs and limits the working position of said roll when the latter is controlling the stock with relation to the knife, said knife, roll and stop, which thus constitute the evening mechanism, coöperating to even the leather in response to and in accordance with the feeler mechanism, by which they are directly influenced or affected so as automatically to grade with reference to said feeler mechanism. The toothed sectors 22, 24 are locked in their adjustment at the proper time by a pivoted gate 39, one of whose ends 40 is fast on a short rock-shaft 41, carrying at its opposite end a crank 42, see Fig. 2, connected by a link 43 to an elbow lever 44, pivoted to the frame 1 at 45, and provided at its free end with a dog or detent 46, shown as having a small tooth to engage the teeth 47 of the sector 24. A spring 48 normally tends to move said dog into engagement with said teeth.

The successively thinner measurements along the opposite edges of the sole or piece being graded are registered or retained by the teeth, 49, Fig. 1, of the sector 22 engaged by a dog 50 on the right-hand side of the machine, which constitutes the gaging mechanism, and this gaging mechanism is locked in its adjustment by the dog 46 at the opposite side of the machine operated by the dropping of the gate 39, when permitted to fall by the complete feeding of the leather piece into the machine. The gaging mechanism constitutes means for automatically varying the position of the cam-stop in accordance with the adjustment of the receiving devices, including the plate 3, supported for relative yielding movement, said adjustable plate 3 being moved by the insertion and passage of the stock between the receiving devices, whereby the movement of the relatively yielding or adjustable regulating rollers 36, 38 at the opposite sides of the cutter or knife 37 is limited. The plate 3 extends transversely across the width of the leather piece which is being graded from side to side thereof, and is adapted to have a pivotal or swinging movement at either end, according as the leather piece is thicker at one edge or at the other. The gaging mechanism is set to grade the stock for any given portion of its length, by means of a foot 51 adjustably secured at 52 in the path of the leather stock to an arm 53 fast on a rock-shaft 54 from whose opposite end projects an arm 55 for raising and lowering an L-shaped bar 56. The free end of this bar 56 engages a pin 57 projecting from the end of the dog 50 which is held under constant tendency to rise by a spring 58, the result being that until the forward end of the piece of leather being graded meets the foot 51, the feeler mechanism can rise and fall and the sector 22 swing back and forth without registering any thickness-determinations, but the moment that the stock engages the foot 51, it thereby raises the bar 56 away from the dog 50 which thereupon engages the teeth 49. As the latter, however, are ratchet teeth, the sector can swing freely to the left Fig. 1, for successive increments of lowering movement of the feeler mechanism. And in order to prevent this gaging mechanism from being influenced by the falling of the feeler mechanism when the leather escapes from beneath the latter, the locking mechanism 44—47 is provided to operate while the rear end of the stock is still beneath the feeler plate 3. For lack of a better generic term to cover the mechanism which is gaged, I call it the leather-engaging means or grading means, as its primary office is to engage the leather pieces for the purpose of usefully perpetuating the determinations of the feeler means. The leather-engaging means or grading means serves to classify the leather, either directly or indirectly, by marking it with a readable symbol, altering its thickness, surface or weight to a measurable extent, or in some way bringing in a distinguishing element in connection with the leather piece, whereby the result of the feeler-detecting is indicated to the operator or is otherwise made available. Two grading means are herein shown, viz: means for actually marking the grade visibly on the leather and means for cutting the leather down to the ascertained grade. These are the two means commonly required by the trade.

Another feature of my invention resides in the provision of means for adjusting the gaging mechanism (and thereby setting the grading mechanism) with extreme nicety to any degree of fineness of adjustment desired, so that, while it is usually sufficient to grade to quarter-irons, the gaging mechanism may be set to grade flush or meager. One means of accomplishing this result is by threading the end 59, of the link 21, to receive nuts 60 by means of which the grading can be adjusted so as to be either flush or meager with respect to the gaging mechanism. The adjustment 59, 60, also serves to compensate for wear and to get extreme certainty and precision of adjustment. I accomplish further saving of leather and accuracy of grading by making the teeth 49 finer than the degrees of grading for which the machine is constructed. For instance, in a machine grading to quarter irons, the teeth 47 of the locking sector 24 will be spaced as required to set the grading devices to quarter irons, but the teeth 49 of the gaging sector 22 will be only half as long, the result being that when the locking lever 44 acts, it finds the sectors 22, 24 already held by the dog 50 to within at least one eighth of an iron of the nearest actual quarter iron thickness of the leather. Hence when the leather escapes from the feeler mechanism that tooth 47 of the sector 24 must lock against the lever 44 which corresponds the nearest to the actual measurement of the leather. In other words the gaging mechanism is set to the nearest quarter iron, instead of always to the next quarter iron, as in the machine of my patent above mentioned.

The grade marking mechanism of my present machine (not herein claimed *per se*, having been divided out for a divisional application) comprises a marking wheel 61, the same as in my aforesaid patents, said wheel being journaled in the lower end of a frame 62, Fig. 5, whose uprights 63, slide vertically in opposite guides 64, of a stationary cross plate 65. Said uprights are connected by a bridge 66, normally held under downward tendency by opposite springs 67, Fig. 3, engaging stationary hooks 68. Intermediate its ends the bridge 66, supports a pivoted arm 69, held under tendency by a spring 70, see Fig. 5, to swing toward the left Fig. 3, said arm having a segmental rack 71 at its lower end, engaging a pinion 72, fast on the shaft 73, which carries the marking wheel 61. The arm 69 is moved to the right Fig. 3, by a chain 74 passing over guide wheels 75, 76 and secured to the sector 22 by an adjustable bolt 77, whose adjustment also serves as a means for bringing the marking mechanism into desired relation (flush or meager as preferred) with the gaging mechanism, and constitutes means to vary the relative grading relation of the marking mechanism and the evening mechanism so that the machine will even flush or meager as desired with relation to the markings. This provision enables the user of the machine to obtain just such relative adjustment between the grading and the evening as he may desire. For example, in one factory, they may desire to have the evening light with reference to the grade markings, whereas in another factory they may desire to have slightly more leather than the grade markings would indicate. So likewise this feature of my invention is useful with spongy or readily compressible stock, as it permits the operator to adjust the grade marker to mark flush with reference to the skiver or cutter to that extent which the quality of the given stock may require, so that when such stock is being passed through the machine, the stock will thereby be marked, not flush, but to the correct thickness to which it will expand upon being released from the pressure of the machine upon passing therefrom, notwithstanding that the knife 37 was set by the gaging mechanism to cut the stock down to a less thickness and did so cut down properly to said less thickness because the stock was thus compressed. The marking wheel 61 is reciprocated in unison with the passage of the stock, said mechanism being herein shown as set in operation by the stock itself, and comprising a plunger 78, depending from the bridge piece, 66, normally engaged by a lifter 79, journaled slightly to one side of the plunger so that the latter may descend, upon escaping from the end 80 thereof, and will be immediately engaged and lifted by the end 81 thereof. Said lifter is rotated by a gear 82, driven by a train of gears 83, 84, 85, the latter forming a part of a clutch whose complemental portion 86 is fast on a pinion 87, driven by a gear 88 on the main shaft 89. The pinion 87 meshes with a gear 90 which positively rotates the upper roll 36, and the shaft 89 carries at its opposite end a pinion 91, meshing with a gear 92, which positively rotates the under-roll 38. As the stock is fed through the machine (by sprocket chains 93 passing over sprockets 94, 95, the latter being driven by sprocket wheels 96, 97, and chain 98 from the right end of the lower roll 38, see Fig. 4) the forward end is brought into engagement with the free end of a lever 99, pivoted at 100 to the bed of the machine and connected to a slide-rod 101, held against an incline 102 by a spring 103 and normally engaged by the lower end of a pivoted cam plate 104, whose cam surface is adapted to be engaged by a pin 105 projecting from the ratchet gear or clutch 85, for moving said gear 85 in opposition to a contained spring 106. Therefore, as the stock strikes the lever 99 it thereby pushes the slide rod 101, to the left Fig. 4. which swings out the cam plate 104 sufficiently to disengage the pin 105 and permit the spring 106, to operate the clutch; and at the same time the rod 101 is disengaged from the plate 104 by riding along the incline 102, whereupon a spring 107 restores the swinging plate 104 to its original position to receive the pin 105 and disengage the clutch at the end of one revolution of the gear 85. The stock is held firmly down upon the sprocket chains by a pair of vertically arranged plates or pressers 108, supported at their opposite ends by rods 109, 110, and springs 111, 112, one of the rods 109, carrying a releasing bar 113 see Fig. 2, provided with a pin 114 at its lower end to lift a hook bar 115, from engagement with a pin 116 on the elbow lever 44, whenever stock is being fed into the machine. The opposite end of said bar 115, is connected at 117 to an elbow lever 118 pivoted at 119, its adjustable end 120 being normally held by a spring 121 against the adjacent lug 33 of the top feed roll or pressure device 36 so that as the work escapes from the machine and the roll 36 falls, its lug 33 swings lever 118 and pulls forward on bar 115, thereby opening the gate 39 through the resulting movement of lever 44, link 43, and crank 42. This is only one of various means of carrying out this part of my invention, another embodiment thereof being contained in my before-mentioned application Ser. No. 257,587. The pinion 82 carries a link 122 for operating the lever 123 of a usual counter or registering mechanism 124.

In use, the operator waits until the gate 39 flies up and then he quickly enters the sole, or other piece of leather which is to be either evened or marked or both, said piece being guided centrally by divergent wings 125 into the flaring mouth or gaping opening formed by the divergent surfaces of the plate 3 and coöperating feed roll beneath it. As soon as the stock engages with the sprocket chains, 93, they immediately pull it into forcible engagement with the feeler mechanism whose plate 3, being evenly balanced, by having the depressing spring 11 centrally located, engages the opposite edges of said sole and follows the varying thicknesses with extreme accuracy. The center being cut away as shown at 4 permits the plate 3 to follow the edge thicknesses without any danger of being raised or improperly deflected by the thickness of the middle portion of said sole, and as one edge or the other of the sole proves to be thinner than the opposite edge, the feeler-plate 3 tips or lowers correspondingly at that end (the opposite end having a pivoting or swinging action with relation to the frame, so as to permit said tipping or lowering), thereby permitting the adjacent post 5 or 6 to descend under the pressure of said spring 11. As said post descends its fixed lug 15 or 16, as the case may be, positively rocks shaft 19 by engaging the arm or lever 17, 18 thereof, and through said shaft the gaging sector 22 is swung to the left Fig. 1. As soon as the front end of the stock has engaged the foot 51, it thereby instantly lifts the bar 56, whereupon pawl 50 engages the ratchet 49 and thereafter the mechanism is gaged to the thinnest edge portion of the stock passed over.

I regard the balanced construction of the feeler mechanism as a radical advance in my present invention. Because of this construction the tension or pressure upon the stock remains substantially the same at the opposite edges thereof, even though one side is thick and the other thin. As the cross-bar 8 is spring-pressed at its center, the ends thereof can tip simultaneously in opposite directions without varying their tension. For the same reason, I have endeavored to eliminate, as far as possible, all resistance of heavy moving parts operated by the feeler mechanism and have provided the approximately balanced sectors and connected parts so that when one end of the plate 3, and its post 5 or 6, and lug 15 or 16, lower, and thereby depress the adjacent arm or lever 17, or 18, the mechanism will not be seriously thrown out of balance or caused to bring uneven pressure to a serious extent upon either edge of the sole being gaged. For this reason the cam stops 27, 28, as well as the sectors 22, 24, and all the connected mechanism are centrally pivoted or otherwise balanced, leaving just sufficient resistance to cause the arms or levers 17, 18, to hold up positively against the lugs 15, 16.

As the forward end of the stock passes from beneath the feeler plate 3, it engages and lifts the pressers 108, which thereupon release the hooked bar 115 from the elbow lever 44, see Fig. 2, thereby leaving the gate 39 in free position to drop as soon as the rear end of the stock has escaped therefrom and passed beneath the feeler plate. When this takes place the dog 46 immediately engages the teeth 47 of the sector 24, thereby positively locking the gaging mechanism. As said locking thereof, takes place while the extreme rear end of the sole is still supporting the feeler plate, the subsequent dropping of said plate cannot in any way affect the adjustment of the gaging mechanism, as would otherwise be the case. If for any reason the feeler plate should rise after the gaging mechanism is locked, this rising or independent adjustment is permitted by the spring 11 and adjacent arrangement of parts. Simultaneously with the movements of the feeler mechanism and sector 22, the marking device or wheel 61 has been correspondingly adjusted by the swinging of the rack 71 under the influence of chain 74 and spring 70 so that it also is locked definitely and accurately at the same time as the gaging mechanism and by the same means. As the stock is fed along beneath the pressers 108 and engages with lever 99, it thereupon throws the clutch automatically into driven engagement with the power mechanism, with the result that as the sole gets into just the right position beneath the marker 61, the plunger 78 is released, thereby permitting the springs 67 to cause the marking wheel 61 to stamp or brand forcibly the proper grade mark on the leather. This is done instantly, and immediately the lifter end raises the marker. The same mechanism and movements which adjusted and set the marking mechanism also adjusted the stops 27, 28. Therefore when the front end of the sole engages the rolls 36, 38, the upper roll or pressure device 36 is lifted thereby until the lugs 33 engage that portion of the eccentric surfaces of said stops directly above said lugs. This flattens the stock or maintains it flat and positively fixes the thickness to which the sole is to be skived, the under roll 38 yielding to all the thicker portions of said sole in well known manner. The raising of the roll 36 by the entrance of the stock thereunder, permits the spring 121 of elbow lever 118 to move the hooked bar or latch 115 to the right Fig. 2 into engagement with the pin 116, so that, upon the escape of the sole from the roll 36, the falling of the lugs 33 operates to pull said hooked bar 115 to the left thereby unlocking the gaging mechanism and opening the gate 39 for permitting the operator to feed another blank into the machine.

As already stated, my present mechanism adapts the machine to a wider variety of work than my previous machines. For example it permits me to edge-grade block soles or square-cut soles such as are usually employed in women's work. This was not feasible with the mechanism shown in my Patent No. 841,809, for a number of reasons, one being the difficulty of making the feelers engage the work properly at the start and another difficulty being the tendency of said feelers to run off from the sole at the shank. In my present machine, however, the sole is forced by the feeding mechanism bodily up against the under side of the feeler plate as distinguished from butting endwise at its corners into the laterally separable legs or edgers of said previous machine, and the feeler mechanism simply moves up and down and has no sidewise or lateral motion, and hence it is capable of feeling along the edges of a block sole as readily and deftly as a rounded or fully shaped sole. I prefer to employ a plate although the engaging portion of the feeler mechanism may consist of a roll or be constructed in various other ways provided it affords a flaring mouth or opening to receive the forward end of the sole bodily and engage the opposite edges of the sole irrespective of varying widths and the shape of the front end thereof.

I have already explained the advantage of having the parts light in weight and balanced in construction. Also their construction is such that there is a minimum of wear; for instance, all the movement of the cam stops 27, 28, takes place when they are out of contact with the lugs 33, and when the latter are raised they simply strike against said stops without any sliding movement thereon. When the position of the stops has been accurately adjusted so as to bring the roll 36 into absolute parallelism with the knife 37, their action thereafter can be depended upon.

All the gaging adjustments, both for marking and for skiving, are accomplished by the passage of the leather without depending for any of said adjustments upon the driving power of the machine and hence there is no possibility of uncertainty or irregularity because of the slip or wear of the gears. All that the driving mechanism is required to do is to operate the feeding mechanism and restore the marking mechanism after it has operated. The positive control of the feeding gate insures the proper feeding of the stock. Also as the operation of the gate is controlled by the stock itself, the speed of feeding is not arbitrarily controlled, but can be as prompt as the operator desires.

From the foregoing description it will be seen that my present mechanism conduces to extreme accuracy and uniformity of results, and operates with minimum wear and power, requires little attention, is easy to operate and readily understood. As stated in my patents, either the marking or the cutting may be omitted, and, as stated elsewhere, I do not limit the leather-engaging means thereto for indicating the ascertained grade with reference to which the stock must be classed.

I do not intend to restrict myself to the precise construction and arrangement of parts, although I have herein set forth the construction which I prefer and consider most practical, as I am aware that many changes in form, arrangement, and combination of parts may be resorted to without departing from the spirit and scope of my invention, as defined in the appended claims taken in connection with the drawings and description. For instance in my copending applications Ser. Nos. 257,587, 325,224 and 130

418,008 I show various modifications included within the scope of certain of the more comprehensive claims of this case.

By the term "block sole" in the claims I mean to include any shaped piece of stock which has a square or blunt end like that commonly found in square ended soles (i. e. soles which have been blocked out but not rounded off) and by the term "feeler mechanism," I intend to include any means for detecting the thinness of the stock, unless otherwise restricted in the particular claim.

Having fully described my invention, what I claim and desire to secure by Letters Patent of the United States is:—

1. A machine of the kind described, comprising feeding mechanism, feeler mechanism, and leather-engaging mechanism adjusted in accordance with the latter for grading the soles according to the determinations of the feeler mechanism, said feeler mechanism including means constructed and operating to automatically engage the square end of a block sole at its opposite edges irrespective of the width of said square end and maintain said edge engagement irrespective of variations in longitudinal contour of said edges.

2. In a machine of the kind described, feeler mechanism for simultaneously engaging the opposite edges of the square front ends of successive block soles irrespective of varying widths, said feeler means being constructed and operating to have its position governed by the longitudinal contours of the soles passing through the machine, means for grading said soles, and gaging mechanism for limiting the adjustment of said grading means to the thinnest portion detected by the feeler means along a given length of each sole.

3. A machine of the kind described, comprising feeler mechanism for simultaneously engaging the opposite edges of the square front ends of successive block soles irrespective of varying widths, means for bodily moving the end portion of said block soles against the detecting face of said feeler mechanism, and leather-engaging mechanism governed by said feeler mechanism for grading the soles according to the determinations of the feeler mechanism.

4. In a machine of the kind described, feeler mechanism adapted to engage the edges of a piece of stock and having balanced pressure applying mechanism for bringing the same pressure upon both of said edges irrespective of their varying relative thicknesses, mechanism for grading the stock in accordance with the determinations of the feeler mechanism, and means for transmitting adjustments for controlling the grading mechanism from said feeler mechanism.

5. In a machine of the kind described, automatic thickness-determining mechanism including thickness-detecting feeler mechanism for engaging the stock at its opposite edges to determine thin spots in said edges, including pressure means having an equalizing device for making said pressure uniform at said opposite edges irrespective of the varying relative thicknesses thereof.

6. In a machine of the kind described, automatic thickness-determining mechanism, including a thickness-detecting feeler plate for engaging the stock at its opposite edges to determine thin spots therein, and means for maintaining uniform pressure at said opposite edges irrespective of the varying relative thicknesses thereof.

7. In a machine of the kind described, feeler mechanism for engaging the stock at its opposite edges, including pressure transmitting means adjacent said opposite edges and a spring common to and acting upon both of said pressure transmitting means for maintaining uniform pressure at said opposite edges irrespective of the varying relative thicknesses thereof.

8. In a machine of the kind described, feeler mechanism including a detecting device extending transversely to the movement of the stock in position to engage the opposite edges of the stock, stock-engaging mechanism to grade the stock, and gaging mechanism including devices for transmitting the movements of the opposite ends of said detecting device for effectively limiting the operation of said stock-engaging mechanism.

9. A machine of the kind described, comprising feeler mechanism including a single detecting member extending the width of the stock to be graded in position to engage the opposite edges of said stock, means opposite said detecting member to support the stock in opposition to the detecting member, said detecting member and said supporting means normally diverging from each other at the entrance end of the machine, so as to present a flaring mouth to receive the front end of a blunt piece of stock and direct it into operative position, and leather-engaging mechanism whose movement is adjusted by said feeler mechanism for grading the stock according to the determinations of the feeler mechanism.

10. In a machine of the kind described, the combination of a cutter, a regulating roller coöperating with the cutter, said roller being adapted to be adjusted by the engagement therewith of the material to be cut, and means independent of the roller controlled by said material for limiting the adjustment of said roller.

11. In a machine of the kind described, the combination of a stationary cutter, a pair of yieldingly supported regulating rollers, a stop for one of the rollers, means controlled by the material for adjusting the same, and means whereby the adjustment of the roller caused by the engagement therewith of the material will be limited by the stop.

12. In a machine of the kind described, the combination of a cutter, a pair of yieldingly supported regulating rollers, an adjustable stop for one of the rollers, means controlled by the material for adjusting the stop, said rollers being adapted to be separated by the material, and means operatively related to one of the rollers and adapted to engage the stop for limiting the movement of said roller.

13. In a machine of the kind described, the combination of work-receiving devices, a cutter, adjustable regulating rollers coöperating with the cutter, one of said receiving devices being adjustable with relation to the other and extending the full width of the stock to be cut, and means separate from the regulating rollers controlled by the adjustment of said receiving device for limiting the adjustment of one of the regulating rollers.

14. In a machine of the kind described, the combination of work-receiving devices, a cutter, adjustable regulating rollers coöperating with the cutter, one of said receiving devices being adjustable with relation to the other and extending the full width of the stock to be cut, an adjustable stop, and means whereby the insertion of the material to be cut between the receiving devices will set the stop to limit the adjustment of one of the regulating rollers.

15. In a machine of the kind described, the combination of a pair of receiving devices, one of which is yieldingly supported and extends the full width of the stock to be graded, a cutter, a pair of regulating rollers, one of which is yieldingly supported, a stop, an operative connection between the stop and the yieldingly supported receiving device, whereby the insertion of the stock between the receiving devices will set the stop, and means operatively related to the yieldingly supported regulating roller and adapted to engage the stop as the stock passes between said regulating rollers to limit the movement of said yieldingly supported regulating roller.

16. In a machine of the kind described, the combination of a pair of receiving devices, one of which is yieldingly supported and extends the full width of the stock to be graded, a cutter, a pair of regulating rollers, one of which is yieldingly supported, a graduated stop, an operative connection between the stop and the yieldingly supported receiving device, whereby the insertion of the stock between the receiving devices will set the stop, and means operatively related to the yieldingly supported regulating roller and adapted to engage the stop as the stock passes between said regulating rollers to limit the movement of said yieldingly supported regulating roller.

17. In a machine of the kind described, the combination of receiving devices, one of which is adjustable and extends laterally the full width of the stock to be graded, a cutter, yieldingly supported regulating rollers coöperating with the cutter, said receiving devices and regulating rollers being spaced from each other, means for directing the stock from the receiving devices to the regulating rollers, and means independent of the regulating rollers whereby the thickness of the stock inserted between the receiving devices will correspondingly limit the adjustment of one of the regulating rollers.

18. In a machine of the kind described, the combination of a pair of receiving devices, one of which is yieldingly supported and extends laterally the width of the stock to be graded, a cutter, regulating rollers coöperating with the cutter, one of which is yieldingly supported, a stop, a yielding connection between the yieldingly supported receiving device and the stop, said stop being adapted to be set by the insertion of the stock between the receiving devices, and means operatively related to the yieldingly supported regulating roller adapted to engage the stop when said roller is adjusted by the passage of the stock between said regulating rollers.

19. In a machine of the kind described, the combination of receiving devices, one of which is yieldingly supported and extends laterally the width of the stock to be graded, a cutter, regulating rollers, one of which is also yieldingly supported, the adjustment of said yielding receiving device being regulated by the thickness of the stock inserted, and means operated by said adjustment for correspondingly limiting the adjustment of the yieldingly supported regulating roller.

20. In a machine of the kind described, the combination of receiving devices, one of which is yieldingly supported and extends laterally the width of the stock to be graded, a cutter, regulating rollers, one of which is also yieldingly supported, a graduated stop, means operatively related to the adjustable regulating roller adapted to engage the stop for limiting the adjustment of said roller, means operatively related to the stop and the adjustable receiving device for automatically varying the position of the stop when said adjustable receiving device is adjusted by the insertion of the material, and means for permitting the independent adjustment of said receiving device after the regulating roller has been adjusted.

21. In a machine of the kind described, feeler mechanism including a flat plate extending transversely to the movement of the stock in position to engage the opposite edges of the stock, stock-engaging mechanism to grade the stock, and gaging mechanism including devices for transmitting the movements of the opposite ends of said detecting device to control said stock-engaging mechanism.

22. In a machine of the kind described, feeler mechanism including detecting means extending transversely to the movement of the stock, devices for transmitting the movements of the opposite ends of said detecting means, means governed by said feeler mechanism for grading the stock, and an equalizer for maintaining equal pressure upon the opposite ends of said detecting means.

23. In a machine of the kind described, feeler mechanism, including means extending transversely to the movement of the stock, devices for transmitting the movements of the opposite ends of said means, a cross-bar engaging said devices, a spring applying pressure centrally of said cross-bar, and means governed by said feeler mechanism for grading the stock.

24. In a machine of the kind described, a feeler plate, devices engaging its opposite ends for transmitting the independent movements of said ends, gaging mechanism for receiving the movements thus transmitted, and mechanism limited in its operation by said gaging mechanism for grading the stock.

25. In a machine of the kind described, a transversely extending feeler plate in position to engage the opposite edges of the stock, having its middle portion cut away to be unaffected by the middle portion of the stock being graded, stock grading mechanism, and means responsive to the independent movements of the ends of said plate for controlling said grading mechanism.

26. In a machine of the kind described, a feeler plate having its middle portion cut away, opposite posts for transmitting the movements of said plate, a cross-bar engaging said posts, a central spring for applying balanced pressure to said plate, stock grading mechanism, and means for receiving the independent movements of said posts and governing said grading mechanism in accordance therewith.

27. A machine of the kind described, comprising feeler mechanism to detect thin spots in a leather piece, stock grading mechanism to grade the leather piece with reference to the thinnest of all the thin spots detected in said piece, power mechanism for operating said grading mechanism, and gaging mechanism operating independently of said power mechanism to control said grading mechanism with reference to said thinnest spot as detected by said feeler mechanism.

28. A machine of the kind described, comprising feeding mechanism, feeler mechanism to detect thin spots in the stock fed, stock grading mechanism to grade each piece of stock with reference to the thinnest of all the thin spots detected therein, power mechanism for operating said feeding mechanism, and gaging mechanism operating independently of said power mechanism to control said grading mechanism with reference to said thinnest spot as detected by said feeler mechanism.

29. A machine of the kind described, comprising feeding mechanism, feeler mechanism to detect thin spots in the stock fed, leather-engaging mechanism to grade each piece of stock to its single determined grade, power mechanism for operating said feeding mechanism and said leather-engaging mechanism, and gaging mechanism actuated solely by the passage of the pieces of stock through the machine for controlling said leather-engaging mechanism in accordance with the determinations of said feeler mechanism.

30. In a machine of the kind described, mechanism for grading the stock, means for detecting thin portions in said stock, means for controlling said grading mechanism in accordance therewith, and means controlling the feeding in of stock actuated by the arriving of the stock at a given point.

31. In a machine of the kind described, mechanism for grading the stock, means for detecting thin portions in said stock, means for governing said mechanism in accordance therewith, and means controlling the feeding in of stock actuated by the arriving of the stock at a given point, said controlling means being constructed and arranged to remain open until the next piece of stock is fed into the machine.

32. In a machine of the kind described, feeler mechanism, a gate at the front thereof for controlling the entrance of stock thereto, and means operated by the escape of a piece of stock from the machine for opening the gate to receive another piece.

33. In a machine of the kind described, feeler mechanism, stock-grading mechanism, and connections for transmitting to the stock grading mechanism, as it is detected by the feeler mechanism, each successive increment of thinness-measurement.

34. In a machine of the kind described, feeler mechanism for detecting the varying thicknesses of a piece of stock, stock-grading mechanism responsive to said feeler mechanism, and connections constructed and operating to transmit from said feeler mechanism to said grading mechanism each successive increment of thinness-measurement as it is detected and to retain the same.

35. In a machine of the kind described, stock-grading mechanism, gaging mechanism operating on the latter continuously including means to adjust said grading mechanism at once to each successive increment of thinness-measurement as it is determined by the feeler mechanism, and feeler mechanism for controlling said gaging mechanism.

36. In a machine of the kind described, mechanism for grading the stock, means for detecting thin places in said stock, and gaging mechanism for controlling said grading mechanism in accordance with said detecting means, said gaging mechanism including locking mechanism for bringing said control to the nearest pre-determined aliquot part of an iron in accordance with which the machine is constructed.

37. In a machine of the kind described, stock grading mechanism, gaging mechanism for governing the same, and feeler mechanism for controlling said gaging mechanism, said gaging mechanism having its parts approximately balanced in movement for relieving said feeler mechanism of resistance therefrom.

38. In a machine of the kind described, stock grading mechanism having an adjustable part for unyieldingly engaging one side of the stock and thereby controlling the position of said stock being graded, and feeler mechanism, said grading mechanism also including adjustable stop-means responsive to said feeler mechanism, operating independently of the movement of said adjustable mechanism for limiting the extent of said movement.

39. In a machine of the kind described, stock grading mechanism having an adjustable part for unyieldingly engaging one side of the stock and thereby controlling the position of said stock being graded, feeler mechanism, adjustable stop-means responsive to said feeler mechanism for limiting the extent of said movement, the stop-means and the part engaged thereby being at times out of sliding contact with each other, and means operating to adjust said stop-means while in said last mentioned position.

40. In a machine of the kind described, stock-grading mechanism, including adjustable mechanism for unyieldingly engaging one side of the stock and thereby controlling the position of said stock, feeler mechanism, gaging mechanism operated by said feeler mechanism, and stop-means, normally out of contact with said adjustable mechanism, regulated by said gaging mechanism for limiting the extent of movement of said adjustable mechanism.

41. In a machine of the kind described, stock grading mechanism, including adjustable mechanism for unyieldingly engaging one side of the stock and thereby controlling the position of said stock, feeler mechanism, stop-means, normally out of contact with said adjustable mechanism, for regulating the extent of movement of the latter, and connections for transmitting to said stop-means when thus out of said contact, the determinations of said feeler mechanism, said stop-means being at rest when engaged by said adjustable mechanism.

42. In a machine of the kind described, stock-grading mechanism, having a vertically movable pressure device for flattening the stock, feeler mechanism, to detect thin spots in the stock to be graded, and intermediate mechanism for controlling the extent of movement of said pressure device in accordance with the grade determined by said feeler mechanism, said intermediate mechanism including a limiting stop movable independently of said pressure device.

43. In a machine of the kind described, feeler mechanism, gaging mechanism, and evening mechanism, the latter including a pressure roll, and means operating independently of the movement of said roll for limiting the extent of said movement in accordance with said gaging mechanism.

44. In a machine of the kind described, feeler mechanism, gaging mechanism, a pressure roll, and a limiting stop therefor actuated by said gaging mechanism, said roll being actuated with reference to said stops by the engagement therewith of the stock being passed through the machine.

45. In a machine of the kind described, grade controlling mechanism, skiving mechanism, including a vertically movable pressure roll, and a pivoted eccentric stop movable independently of said roll for limiting the movement of the latter.

46. In a machine of the kind described, grading mechanism for grading the stock, feeler mechanism for automatically determining the grade, gaging mechanism controlled by said feeler mechanism for governing said grading mechanism, and adjusting means for automatically regulating said gaging mechanism to a predetermined variation from the grade determined by said feeler mechanism.

47. In a machine of the kind described, feeler mechanism, a grade marker and evening mechanism, whose marking and evening positions are regulated by said feeler mechanism, and means to vary the relative grading relation of said marker and said evening mechanism so that the machine will even flush or meager as desired with relation to the marking.

48. In a machine of the kind described, gaging mechanism, a grade marker and evening mechanism whose marking and evening positions are regulated by said gaging mechanism, means for adjusting said gaging mechanism to set the grade marker and evening mechanism to grade either flush or meager as desired, and means to vary the relative grading relation of said marker and said evening mechanism so that the machine will even either flush or meager as desired with relation to the marking.

49. In a machine of the kind described, feeler mechanism, evening mechanism whose regulation is under the control of said feeler mechanism, including a pressure device, automatically adjustable stop-means to limit the movement of said pressure device, and adjusting means to regulate the stopping position of said pressure device to a desired variation from the determinations of said feeler mechanism.

50. In a machine of the kind described, feeler mechanism, a grade marker and evening mechanism, whose marking and evening positions are regulated by said feeler mechanism, said evening mechanism including a pressure device, automatically adjustable unyielding stop-means to limit the movement of said pressure device, and means to vary the relative grading relation of said marker and evening mechanism so that the machine will even flush or meager as desired with relation to the markings.

51. In a machine of the kind described, feeler mechanism including means for engaging the stock at a plurality of points, a plurality of transmitting devices, a rock-shaft, arms extending rigidly from said shaft to be engaged respectively with said transmitting devices, and gaging mechanism operated by said rock-shaft.

52. In a machine of the kind described, feeler mechanism, gaging mechanism operated thereby, said gaging mechanism comprising a pivoted device having a ratchet edge, a dog for engaging said ratchet, and a setting device operated by the passage of stock to permit said dog to engage said ratchet.

53. In a machine of the kind described, feeler mechanism, a plurality of pivoted toothed members operated thereby, engaging dogs therefor, one of said dogs serving to retain all increments of downward movement of said feeler mechanism and the other of said dogs operating to lock said members against further movement.

54. In a machine of the kind described, feeler mechanism, a plurality of pivoted toothed members operated thereby, engaging dogs therefor, one of said dogs serving to retain all increments of downward movement of said feeler mechanism and the other of said dogs operating to lock said members against further movement, a feed controlling gate, and connections therefrom for operating said locking dog.

55. In a machine of the kind described, feeler mechanism, stock-grading mechanism, gaging mechanism for governing the latter in accordance with the former, a feed controlling gate for controlling the entrance of stock to the machine, means for automatically closing said gate when stock has been fed to the machine, and connections coöperating with said gate and with said grading mechanism for automatically opening said gate when said stock has passed through the machine.

56. In a machine of the kind described, feeler mechanism, stock grading mechanism, means for governing the latter in accordance with the former, feeding mechanism, and spring-pressed presser plates set on edge adjacent said feeding mechanism between said feeler mechanism and said grading mechanism to engage and retain the stock in proper position.

57. In a machine of the kind described, feeler mechanism for detecting the thickness-grade of the stock passing through the machine, a feed controlling gate at the front of said feeler mechanism, and means at the rear of said feeler mechanism operated by the presence of the stock for closing said gate to prevent the feeding of fresh stock to said feeler mechanism.

58. In a machine of the kind described, feeler mechanism, a feed controlling gate at the front thereof in the path of the stock, and means at the rear thereof in the path of the stock operated by the passage of said stock for closing said gate, stock grading mechanism, connections from the feeler mechanism to the grading mechanism for governing the latter with relation to the former, a device raised by the passage of said stock from said feeler mechanism to said grading mechanism, and means operated by the lowering of said device for opening said gate.

59. In a machine of the kind described, feeler mechanism to detect the grade of a piece of stock, grading means governed with reference to said feeler mechanism, a feed-controlling gate, and means for preventing the opening of said gate until the stock has been graded.

60. In a machine of the kind described, feeler mechanism to detect the grade of a piece of stock, grading means governed with reference to said feeler mechanism, a feed-controlling gate, and means for maintaining said gate open during the absence of stock from the machine.

61. In a machine of the kind described, feeler mechanism to detect the grade of a piece of stock, grading means governed with reference to said feeler mechanism, a feed-controlling gate, and gate operating mechanism controlled by the stock itself to open the gate.

62. In a machine of the kind described, feeler mechanism to detect thin spots in pieces of leather, grading mechanism to operate on the pieces, including a movable part, a gate at the front of the machine for controlling the entrance of said pieces and connections between said movable part and gate for controlling the movements of the gate.

63. In a machine of the kind described, feeler mechanism to detect thin spots in leather pieces, mechanism including a heavy movable part arranged to fall upon the escape of a leather piece, a gate at the front of the machine controlling the entrance of stock to the feeler mechanism, and connections from said gate to said falling part in position to be operated by said falling movement to open said gate to permit the entrance of stock to the feeler mechanism.

64. In a machine of the kind described, the combination of receiving devices, one of which is adjustable, extends laterally the full width of the stock to be graded, and is supported for endwise swinging movement, a cutter, regulating rollers, one of which is also adjustably supported, a stop, means operatively related to the adjustable regulating roller for engaging the stop to limit the adjustment of the roller, and means operated by the adjustment of said adjustable receiving device for setting said stop.

65. In a machine of the kind described, the combination of receiving devices, one of which is adjustable, extends laterally the full width of the stock to be graded, and is supported for endwise swinging movement, a cutter, regulating rollers coöperating therewith, one of which is also adjustably supported, said adjustable receiving device being adjusted by the insertion of the material, and means whereby the adjustment of the regulating roller will be limited by the thinner side of the material between the receiving devices.

66. In a machine of the kind described, the combination of receiving devices, one of which is adjustable, extends laterally the full width of the stock to be graded, and is supported for endwise swinging movement, a cutter, regulating rollers coöperating therewith, one of which is also adjustably supported, said adjustable receiving device being adjusted by the insertion of the material, means whereby the adjustment of the regulating roller will be limited by the thinner side of the material between the receiving devices, and means for permitting a further adjustment of the adjustable receiving device after the regulating roller has been adjusted.

67. In a machine of the kind described, the combination of receiving devices, one of which is adjustable, extends laterally the full width of the stock to be graded, and is supported for endwise swinging movement, a cutter, regulating rollers, one of which is also adjustably supported, an adjustable stop, means operatively related to the adjustable regulating roller and adapted to engage the stop, means for adjusting the stop, means operatively related to the adjustable receiving device for operating the stop-adjusting means, and yielding means disposed between the last said means and the stop-adjusting means to permit a further adjustment of the said receiving device when the regulating roller is adjusted.

68. In a machine of the kind described, stock-grading mechanism, gaging mechanism to govern said grading mechanism, controlled by the stock for limiting the adjustment of said grading mechanism, including locking mechanism for bringing said adjustment to the nearest predetermined adjustment in accordance with which said gaging mechanism is constructed.

69. In a machine of the kind described, stock-grading mechanism, gaging mechanism to govern said grading mechanism, controlled by the stock for limiting the adjustment of said grading mechanism, including notched mechanism and means coöperating with the notches to bring said adjustment to the nearest predetermined adjustment in accordance with which said gaging mechanism is constructed.

70. In a machine of the kind described, the combination of receiving devices, one of which is adjustable, a cutter, regulating rollers, one of which is also adjustable, and means independent of said adjustable roller controlled by the material to be cut for limiting the adjustment of said roller, including mechanism provided with a series of notches, and means controlled by said material for entering one of said notches to bring said adjustment to the nearest predetermined adjustment in accordance with which the machine is constructed.

71. In a machine of the kind described, the combination of receiving devices, one of which is adjustable, a cutter, regulating rollers, one of which is also adjustable, and stop-means independent of said adjustable roller controlled by the material to be cut for limiting the adjustment of said roller, including a notched member and means controlled by said material for interlocking with said notched member and bringing the said adjustment to the nearest predetermined adjustment in accordance with which the machine is constructed.

72. In a machine of the kind described, stock-grading mechanism having an adjustable part for unyieldingly engaging one side of the stock and thereby controlling the position of said stock being graded, a graduated stop operating independently of the movement of said adjustable part for limiting the extent of said movement, and stop-adjusting means independent of said part controlled by said stock.

73. In a machine of the kind described, stock-grading mechanism having an adjustable part for unyieldingly engaging one side of the stock and thereby controlling the position of said stock being graded, graduated stop-means which is at times out of sliding contact with the part engaged thereby, and means responsive to the stock being graded to adjust said graduated stop-means while in said last mentioned position.

74. In a machine of the kind described, the combination of receiving devices, one of which is adjustable, a cutter, regulating rollers, one of which is also adjustable, unyielding means movable with said adjustable roller, an adjustable graduated stop out of engagement with said unyielding means when being adjusted, and means operatively related to the adjustable receiving device to adjust said stop, movement of said adjustable roller by the engagement of the stock therewith bringing said unyielding means into engagement with said stop when the latter is stationary.

75. In a machine of the kind described, feeler mechanism to detect thin spots in a leather piece, and grading mechanism governed by said feeler mechanism, said feeler mechanism including a member extending across the leather piece from side to side thereof, and opposite means engaging said member for transmitting the movements thereof.

In testimony whereof, I have signed my name to this specification, in the presence of two subscribing witnesses.

ELMER P. NICHOLS.

Witnesses:
  GEO. H. MAXWELL,
  ETHEL G. PROCTOR.